United States Patent [19]
Sawada

[11] Patent Number: 5,971,089
[45] Date of Patent: *Oct. 26, 1999

[54] AUTOMOTIVE TRACTION OR TRAVEL CONDITION CONTROL SYSTEM WITH ENGINE POWER AND BRAKE CONTROL

[75] Inventor: Mamoru Sawada, Yokkaichi, Japan

[73] Assignee: Nippondenso Co., Inc., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/548,999

[22] Filed: Oct. 27, 1995

[30] Foreign Application Priority Data

Oct. 27, 1994 [JP] Japan .................................. 6-264152

[51] Int. Cl.$^6$ .................................................. B60T 7/12
[52] U.S. Cl. .............................. 180/197; 701/83; 701/84; 701/90
[58] Field of Search ..................... 180/197; 364/426.026, 364/426.027, 426.028, 426.029, 426.031, 426.032, 426.033, 426.036; 303/191, 139, 141, 142; 477/37, 107; 701/82, 83, 84, 85, 86, 87, 90

[56] References Cited

U.S. PATENT DOCUMENTS

| | | | |
|---|---|---|---|
| 4,625,824 | 12/1986 | Leiber ..................................... | 180/197 |
| 4,739,856 | 4/1988 | Inagaki et al. ......................... | 180/197 |
| 4,809,807 | 3/1989 | Leiber . | |
| 4,825,371 | 4/1989 | Hoashi et al. .......................... | 180/197 |
| 4,849,891 | 7/1989 | Krohn et al. ............................ | 180/197 |
| 4,866,623 | 9/1989 | Ise et al. .................................. | 180/197 |
| 4,955,449 | 9/1990 | Hillburger et al. ..................... | 180/197 |
| 4,962,824 | 10/1990 | Hagiya et al. ........................... | 180/197 |
| 4,964,679 | 10/1990 | Rath ........................................ | 303/100 |
| 4,976,330 | 12/1990 | Matsumoto .............................. | 180/197 |
| 4,982,807 | 1/1991 | Hillburger et al. ..................... | 180/197 |
| 5,014,202 | 5/1991 | Thatcher ................................. | 180/197 |
| 5,113,718 | 5/1992 | Sato ........................................ | 180/197 |
| 5,365,443 | 11/1994 | Tsuyama et al. ....................... | 180/197 |
| 5,443,307 | 8/1995 | Maier ...................................... | 303/169 |
| 5,469,359 | 11/1995 | Tsuyama et al. ....................... | 180/197 |

FOREIGN PATENT DOCUMENTS

| | | |
|---|---|---|
| 0557965 | 9/1993 | European Pat. Off. . |
| 62-203863 | 9/1987 | Japan . |
| 63-222945 | 9/1988 | Japan . |
| 1103563 | 4/1989 | Japan . |
| 133365 | 7/1989 | Japan . |
| 2175371 | 7/1990 | Japan . |
| 374226 | 3/1991 | Japan . |
| 3281439 | 12/1991 | Japan . |
| 5116612 | 5/1993 | Japan . |
| 5208629 | 8/1993 | Japan . |
| 5229414 | 9/1993 | Japan . |
| 5229416 | 9/1993 | Japan . |
| 5294225 | 11/1993 | Japan . |

*Primary Examiner*—Lanna Mai
*Assistant Examiner*—Avraham H. Lerner
*Attorney, Agent, or Firm*—Pillsbury Madison & Sutro LLP

[57] ABSTRACT

A traction control system for an automotive vehicle is provided which controls engine power and braking force to recover traction of wheels when wheel slippage occurs during acceleration. The traction control system has four traction control modes and four control switching modes for switching between the traction control modes smoothly without any mechanical shock. In each of the control switching modes, one of the engine power control and the braking force control is restricted gradually according to its control capacity which is, for example, determined based on a period of time left until the control is prohibited. If the control capacity is decreased undesirably, the control is modified so as to increase the control capacity.

32 Claims, 8 Drawing Sheets

AUTOMOTIVE TRACTION OR TRAVEL CONDITION CONTROL SYSTEM WITH ENGINE POWER AND BRAKE CONTROL

BACKGROUND OF THE INVENTION

1. Technical Field

The present invention relates generally to a control system for controlling a traveling condition of an automotive vehicle. More particularly, the invention relates to a traction control system which controls engine and braking operations to modify driving forces transmitted to driven wheels upon an occurrence of wheel slippage during acceleration.

2. Background Art

An acceleration-caused slippage control system is well known in the art which controls wheel slippage when an automotive vehicle starts quickly and/or during acceleration. This slippage control system determines that acceleration-caused wheel slippage occurs, for example, when a slip ratio of driven wheels exceeds a reference slip ratio, and controls the acceleration-caused wheel slippage so that the slip ratio of the driven wheels may fall within an allowable range.

Specifically, when wheel slippage occurs during acceleration, the system performs engine control which regulates an opening degree of a throttle valve based on the average speeds of right and left driven wheels to control the engine power, and braking control which adjusts the pressure of brake fluid for modifying braking forces applied to the driven wheels.

The above slippage control system, however, encounters the following drawback. When a slip ratio exceeds a threshold value, the system determines that wheel slippage has occurred, and performs engine control and the braking control simultaneously. Thus, for example, if a distribution ratio between the engine control and the braking control is set suitably for controlling wheel slippage in a low-middle speed range, excessive braking forces may be applied to the driven wheels in relation to a gear ratio according to vehicle speed, thereby causing undesirable deceleration, or braking forces applied to the right and left driven wheels to be put out of balance. This results in a deterioration in straight line stability.

For avoiding the above drawback, Japanese Patent First Publication No. 3-74226 teaches a traction control system which performs engine control when a slip ratio reaches an engine control threshold value smaller than a braking control threshold value at which braking control is initiated in a high speed range, in other words, a ratio of the braking control to the engine control under acceleration-caused slippage control is decreased.

However, since the above prior art system sets the two threshold values only in the high speed range, it there still is room for improvement in achieving more stable traveling conditions.

For example, when the vehicle accelerates from the lower speed range to the high speed range, the engine control threshold value is changed suddenly, causing control conditions to be changed suddenly. This is quite inconvenient for stable control of vehicle traveling conditions.

SUMMARY OF THE INVENTION

It is therefore a principal object of the present invention to avoid the disadvantages of the prior art.

It is another object of the present invention to provide a traveling control system for an automotive vehicle which controls, for example, a switching condition between engine control and braking control under traction control for achieving traveling stability.

According to one aspect of the present invention, there is provided a traveling control apparatus for an automotive vehicle which comprises a control means for controlling a given operation of the automotive vehicle, a control capacity determining means for determining a control capacity of the control means until the control means prohibits the control of the given operation, and a control restricting means for restricting the control of the given operation by the control means according to the control capacity determined by the control capacity determining means.

In the preferred mode of the invention, the control means includes first operation controlling means and second operation controlling means. The control capacity determining means determines the control capacity of at least one of the first and second operation controlling means. The control restricting means restricts the control of the at least one of the first and second operation controlling means based on the determined control capacity.

The control restricting means has a switching mode in which the degree of control of the given operation is changed at a preselected rate.

The control restricting means restricts the control of the given operation according to the control capacity so as to modify a change in the control capacity.

The control means prohibits the control of the given operation when the control capacity exceeds a given threshold value.

A control resuming means is further provided for resuming the control of the control means according to the control capacity when the control means prohibits the control of the given operation.

The control resuming means has a control switching mode which resumes the degree of the control of the control means at a given rate. The control resuming means enters the control switching mode when the control capacity exceeds the given threshold value.

The first operation controlling means controls a first operation of the automotive vehicle. The second operation controlling means controls a second operation of the automotive vehicle different from the first operation to control a given traveling condition in cooperation with the control of the first operation by the first operation controlling means. The control capacity determining means determines a control capacity of the first operation controlling means until the control capacity reaches a given threshold value which prohibiting the control of the first operation. The control restricting means includes a first control adjusting means and a second control adjusting means. The first control adjusting means adjusts the degree of the control of the first operation controlling means according to the control capacity of the first operation controlling means. The second control adjusting means adjusts the degree of the control of the second operation controlling means based on the degree of the control of the first operation controlling means adjusted by the first control adjusting means.

The degree of the control of the second operation controlling means is increased according to a decrease in degree of the control of the first operation controlling means.

When the prohibition of the control of the first operation is released, the degree of the control of the second operation controlling means is adjusted according to the degree to which the prohibition of the control of the first operation is released.

The degree of the control of the second operation controlling means is decreased according to an increase in degree of the control of the first operation controlling means.

According to another aspect of the present invention, there is provided a traveling control apparatus for an automotive vehicle which comprises a first operation controlling means for controlling a first operation of the automotive vehicle to modify a given traveling condition, a second operation controlling means for controlling a second operation of the automotive vehicle to modify the given traveling condition, a control capacity determining means for determining a control capacity of the second operation controlling means until the control capacity reaches a given limit which prohibits the control of the second operation, a control restricting means for restricting the control of the second operation controlling means according to the control capacity of the second operation controlling means during prohibition of the control of the first operation controlling means, and a warning means for providing a warning signal according to a control restricting condition of the control restricting means.

The first operation controlling means controls a driving force transmitted to a wheel of the automotive vehicle. The second operation controlling means controls a braking force applied to the wheel. The control capacity determining means determines a driving force controlling capacity and a braking force controlling capacity. The control restricting means adjusts the degrees of control of the first operation controlling means and the second operation controlling means according to the driving force controlling capacity and the braking force controlling capacity.

An acceleration-caused wheel slippage detecting means is further provided for detecting acceleration-caused wheel slippage. The first operation controlling means controls engine power to modify the driving force for restricting the acceleration-caused wheel slippage. The second operation controlling means controls the braking force for restricting the acceleration-caused wheel slippage.

A wheel speed difference determining means is further provided for determining a wheel speed difference between right and left wheels. The first operation controlling means controls the engine power to restrict the wheel speed difference. The second operation controlling means controls the braking force to restrict the wheel speed difference. The control restricting means adjusts the degrees of control of the first operation controlling means and the second operation controlling means according to the driving force controlling capacity and the braking force controlling capacity.

According to a third aspect of the present invention, there is provided a traveling control apparatus for regulating output power of an engine mounted on a vehicle to control a traveling condition of the vehicle which comprises a traveling condition detecting means for detecting a traveling condition of the vehicle, an engine power controlling means for controlling the output power of the engine based on the traveling condition detected by the traveling condition detecting means to bring the vehicle into a desired traveling condition, an operation condition detecting means for detecting an operation condition of the engine during the control of the output power by the engine power controlling means, an engine control capacity determining means for determining an engine control capacity until the operation condition of the engine detected by the operation condition detecting means reaches a control prohibiting condition where the engine power controlling means is prohibited from controlling the output power of the engine, and an engine power control changing means for changing a degree to which the output power of the engine is controlled by the engine power controlling means according to the engine control capacity determined by the engine control capacity determining means.

In the preferred mode of the invention, the engine power control changing means decreases the degree to which the output power of the engine is controlled by the engine power controlling means according to a decrease in the engine control capacity determined by the engine control capacity determining means.

The engine power control changing means deactivates the engine power controlling means when the engine control capacity is decreased below a given threshold value.

When the engine control capacity is increased to a second threshold value after the engine power controlling means is deactivated, the engine power control changing means releases the deactivation of the engine power controlling means to resume the control of the output power of the engine.

According to a fourth aspect of the invention, there is provided a traveling control apparatus for regulating a braking force applied to a wheel of a vehicle which comprises a braking force regulating means for regulating a braking force of the wheel, a traveling condition detecting means for detecting a traveling condition of the vehicle, a braking controlling means for controlling the braking force regulating means to regulate the braking force based on the traveling condition detected by the traveling condition detecting means to bring the vehicle into a desired traveling condition, an operation condition detecting means for detecting an operation condition of the braking force regulating means during the control of the braking force by the braking force regulating means, a braking control capacity determining means for determining a braking control capacity until the operation condition of the braking force regulating means reaches a control prohibiting condition where the braking force regulating means is prohibited by the braking controlling means from controlling the braking force of the wheel, and a braking force control changing means for changing a degree to which the braking force of the wheel is controlled by the braking force regulating means according to the braking control capacity determined by the braking control capacity determining means.

In the preferred mode of the invention, the braking force control changing means decreases the degree to which the braking force of the wheel is controlled by the braking force regulating means according to a decrease in the braking control capacity determined by the braking control capacity determining means.

The braking force control changing means deactivates the braking force regulating means when the braking control capacity is decreased below a given threshold value.

When the braking control capacity is increased to a second threshold value after the braking force regulating means is deactivated, the braking force control changing means releases the deactivation of the braking force regulating means to resume the regulation of the braking force of the wheel.

According to a fifth aspect of the invention, there is provided a traveling control apparatus for a vehicle which comprises an engine operation condition detecting means for detecting an operation condition of an engine mounted on the vehicle, a first control capacity determining means for determining an engine control capacity until the operation condition of the engine detected by the engine operation condition detecting means reaches a control prohibiting condition where an output power of the engine is prohibited from being regulated, a braking force regulating means for regulating a braking force applied to a wheel, a braking operation condition detecting means for detecting an operation condition of the braking force regulating means, a second control capacity determining means for determining a braking control capacity until the operation condition of the braking force regulating means reaches a control prohibiting condition where the braking force regulating means is prohibited from regulating the braking force of the wheel, a traveling condition detecting means for detecting a traveling condition of the vehicle, a regulation determining means for determining the amount of regulation of the output power of the engine and the amount of regulation of the braking force applied to the wheel, respectively, based on the traveling condition detected by the traveling condition detecting means so as to bring the vehicle into a desired traveling condition, and a regulation correcting means for correcting the amount of regulation of the output power of the engine and the amount of regulation of the braking force based on the engine control capacity and the braking control capacity determined by the first and second control capacity determining means, respectively, when the regulation correcting means corrects one of the amount of regulation of the output power of the engine and the amount of regulation of the braking force, the regulation correcting means correcting the other according to the corrected amount of regulation.

In the preferred mode of the invention, the regulation correcting means decreases the amount of regulation of the output power of the engine as the engine control capacity determined by the first control capacity determining means is decreased. The regulation correcting means also decreases the amount of regulation of the braking force as the braking control capacity determined by the second control capacity determining means is decreased.

When the amount of regulation of one of the output power of the engine and the braking force is decreased, the amount of regulation of the other is increased according to a decrease in the amount of regulation of the one of the output power of the engine and the braking force.

The regulation determining means determines the amount of regulation of the output power of the engine and the amount of regulation of the braking force, respectively, so as to restrict acceleration-caused slippage occurring at the wheel.

When a speed difference is created between right and left wheels of the vehicle, the regulation determining means determines the amount of regulation of the output power of the engine and the amount of regulation of the braking force, respectively, so as to restrict the speed difference.

BRIEF DESCRIPTION OF THE DRAWINGS

The present invention will be understood more fully from the detailed description given hereinbelow and from the accompanying drawings of the preferred embodiment of the Invention, which, however, should not be taken to limit the invention to the specific embodiment but are for explanation and understanding only.

In the drawings.

DESCRIPTION OF THE PREFERRED EMBODIMENT

Figure 1:
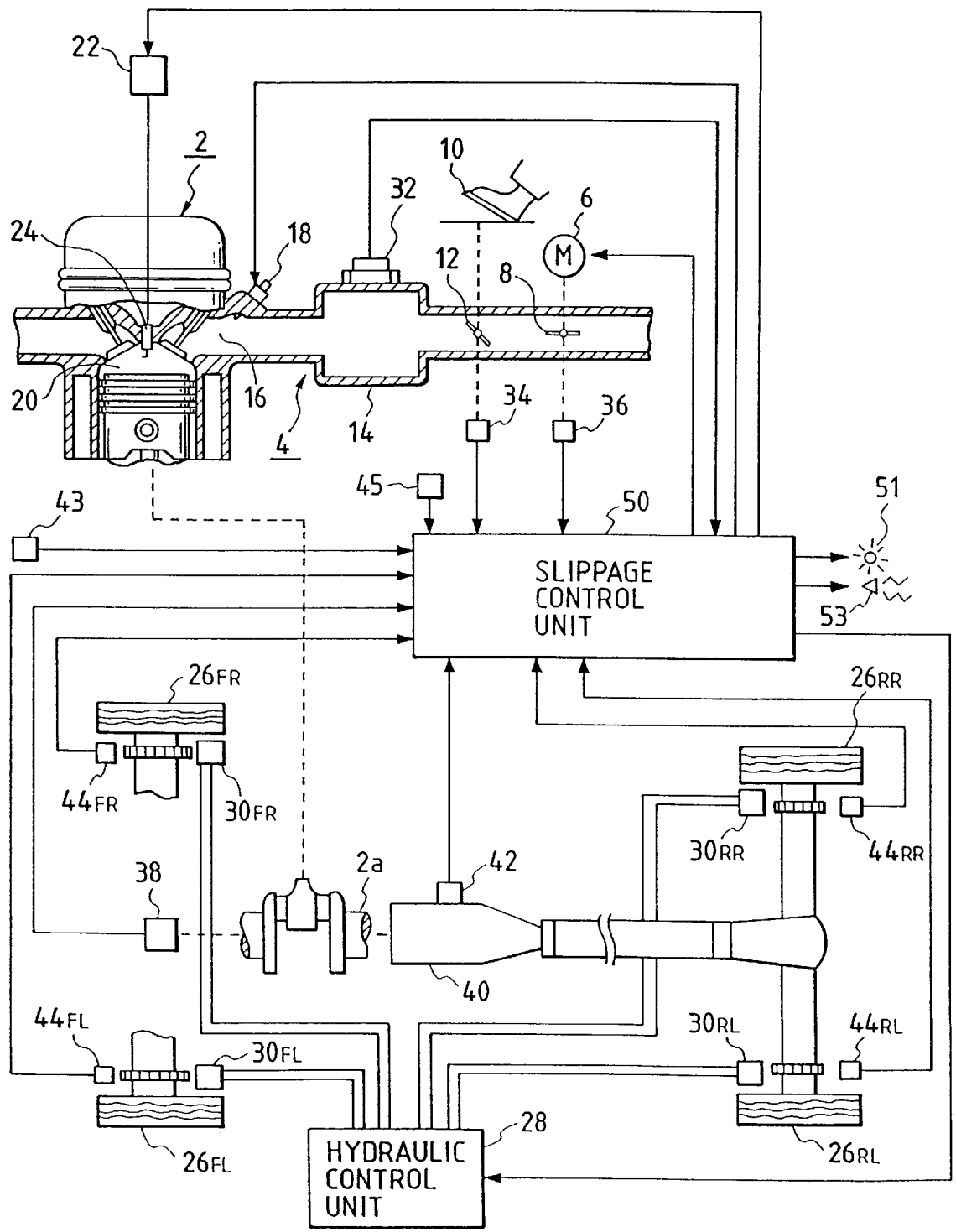
FIG. 1 is a block diagram which shows a traction control system according to the present invention.

Referring now to the drawings, particularly to FIG. 1, there is shown a traction control system according to the present invention which is mounted in a front-engine, rear-wheel drive automotive vehicle powered by an internal combustion engine 2.

The shown vehicle has in an air intake passage 4 a sub-throttle valve 8, a main throttle valve 12, a surge tank 14, and a fuel injection valve 18. The sub-throttle valve 8 is actuated by an electric motor 6. The main throttle valve 12 is moved according to the degree of depression of an accelerator pedal 10 operated by a driver. The surge tank 14 is operable to absorb sudden rises of pressure of intake air. The fuel injection valve 18 injects fuel into an intake port 16 leading to a cylinder 20. In the cylinder 20, a spark plug 24 is mounted which is supplied with high voltage from an ignition coil 22.

Wheel cylinders 30FR, 30FL, 3ORR, and 3ORL are installed on front compliance wheels 26FR and 26FL and rear driven wheels 26RR and 26RL, respectively, which are actuated by a hydraulic control unit 28 having a hydraulic pump and solenoid valves (not shown) to apply braking forces to the wheels.

The traction control system includes an intake air pressure sensor 32, a main throttle valve position sensor 34, a sub-throttle valve position sensor 36, an engine speed sensor 38, a gear ratio sensor 42, a catalyst temperature sensor 43, and a brake fluid temperature sensor 45.

The intake air pressure sensor 32 measures the pressure in the surge tank 14 to provide a signal indicative thereof to a slippage control unit 50. The main throttle valve position sensor 34 and the sub-throttle valve position sensor 36 determine opening degrees of the main and sub-throttle valves 12 and 8, respectively, and provide signals indicative thereof to the slippage control unit 50. The engine speed sensor 38 detects rotation of a crankshaft 2a to determine an engine speed of the engine 2, and provides a signal indicative thereof to the slippage control unit 50. The gear ratio sensor 42 determines a gear ratio (or gear position) of a transmission 40, and provides a signal indicative thereof to the slippage control unit 50. The catalyst temperature sensor 43 measures the temperature of catalyst in a catalytic converter (not shown), and provides a signal indicative thereof to the slippage control unit 50. The brake fluid temperature sensor 45 measures the temperature of a brake fluid supplied to the wheel cylinders 30FR to 3ORL, and provides a signal indicative thereof to the slippage control unit 50.

The traction control system further includes wheel speed sensors 44FL, 44FR, 44RL, and 44RR which measure wheel speeds of the wheels 26FL, 26FR, 26RL, and 26RR, respectively, and provide signals indicative thereof to the slippage control unit 50.

Figure 2:
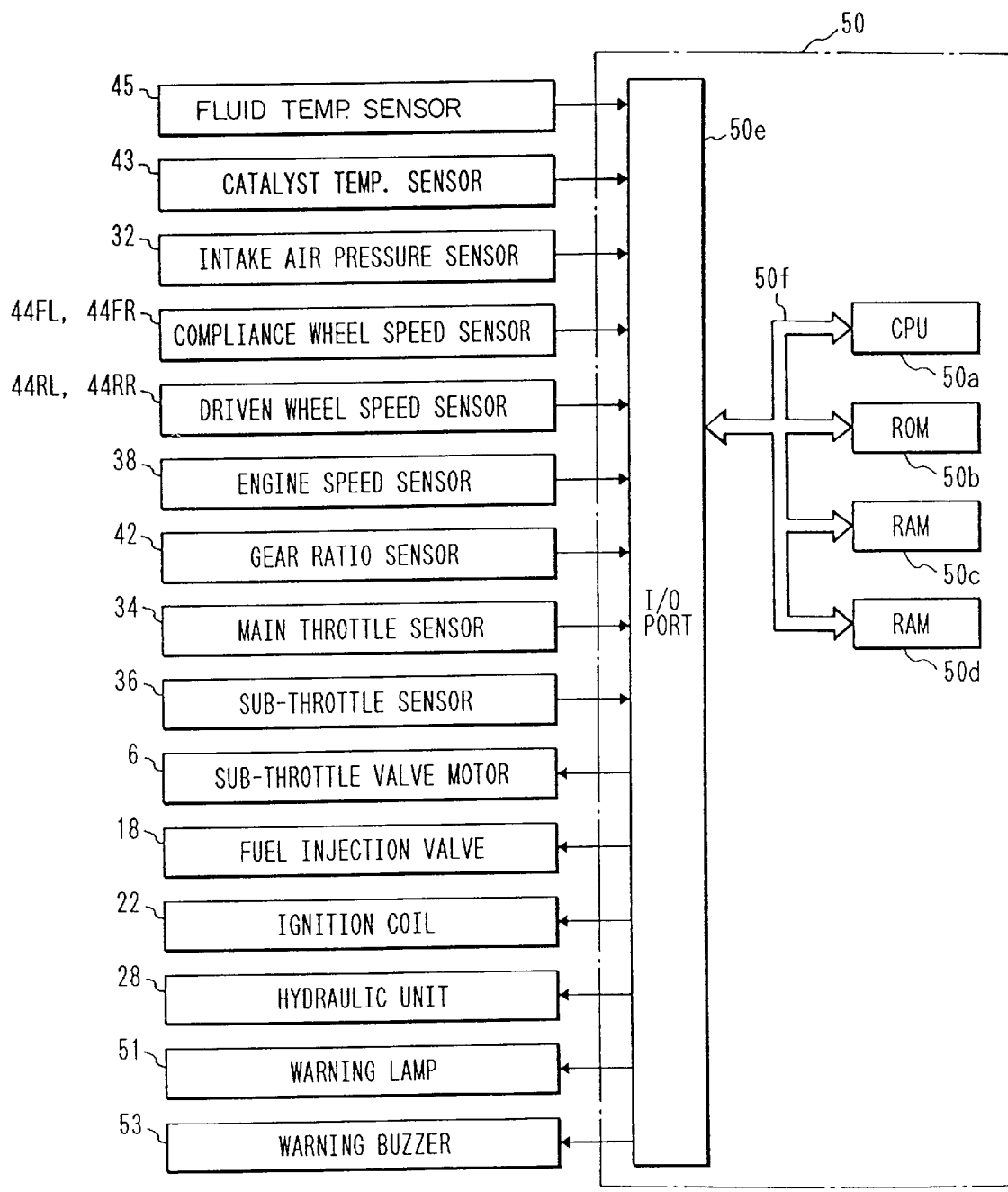
FIG. 2 is a block diagram which shows circuit arrangements around a slippage control unit of a traction control system.

The slippage control unit 50 is responsive to the signals from the above sensors to provide control signals to actuators, as will be described in detail later, for controlling acceleration-caused wheel slippage. The slippage control unit 50 includes, as shown in FIG. 2, a microcomputer consisting of a CPU 50a, a ROM 50b, a RAM 50c, a backup RAM 50d, an I/O port 50e, and a bus 50f connecting these elements. The I/O port 50e connects with the intake air pressure sensor 32, the main throttle valve position sensor 34, the sub-throttle valve position sensor 36, the engine speed sensor 38, the gear ratio sensor 42, the catalyst temperature sensor 43, the brake fluid temperature sensor 45, and the wheel speed sensors 44FL to 44RR, and also connects with a warning lamp 51 and a warning buzzer 53 as well as the motor 6, the fuel injection valve 18, the ignition coil 22, and the hydraulic control unit 28. The warning lamp 51 and the warning buzzer 53 are, as will be discussed later, provided for informing a vehicle operator of initiation of prohibition of the traction control.

The slippage control unit 50 determines a slip ratio based on acceleration-caused slippages of the left driven wheel 26RL and the right driven wheel 26RR, and controls the acceleration-caused slippages under engine power control and braking control. The engine power control is accomplished by modifying an opening degree of the sub-throttle valve 8 (including a fuel cut), the amount of fuel injected by the fuel injection valve 18, and/or ignition timing to control the output power of the engine 2. The braking control is accomplished by modifying hydraulic pressures supplied to the left driven wheel 26RL and the right driven wheel 26RR.

For example, when a sudden acceleration operation caused by a vehicle operator while traveling on a low-friction ($\mu$) road surface causes the driven wheels 26RL and 26RR to skid, the slippage control unit 50 performs engine power control by issuing an FCT control command to have the engine 2 undergo a fuel cut to disable some of the cylinders. At the same time the slippage control unit 50, performs braking control by outputting a control signal to the hydraulic control unit 28 to modify the hydraulic pressure supplied to the wheel cylinders 3ORL and 3ORR to control brake forces acting on the driven wheels 26RL and 26RR.

The engine power, as discussed above, may alternatively be controlled by closing the sub-throttle valve 8, decreasing the amount of injected fuel, changing an air-fuel ratio, retarding ignition timing, changing a gear position of the transmission 40, and/or regulating a line pressure supplied to the transmission 40 (i.e., the degree of engagement of transmission clutches). Additionally, if the traction control system is used with an electric vehicle, the engine power may be changed by controlling an electric motor driving the electric vehicle. In the following discussion, it is assumed that the engine power is controlled under FCT control.

The braking control may be performed to modify the hydraulic pressure supplied to all the driven wheels independently or simultaneously.

An operation of the traction control system of this embodiment will be discussed below with reference to FIGS. 3 to 10.

Figure 3:
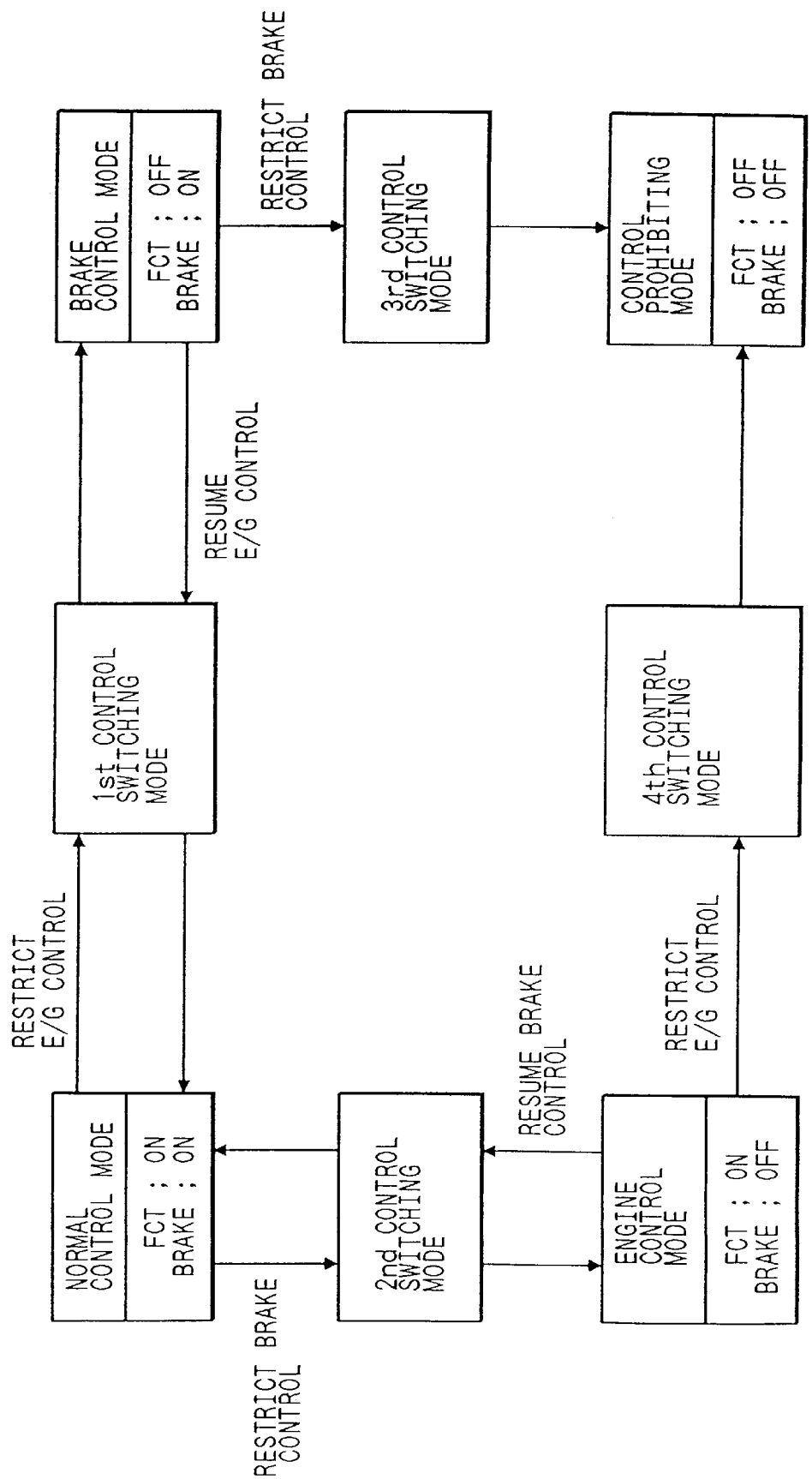
FIG. 3 is a block diagram which shows the relation among traction control modes.

When performing the acceleration-caused slippage control, the traction control system, as shown in FIG. 3, operates in a plurality of control modes: a normal control mode, a brake control mode, an engine control mode, a control prohibiting mode, and first to fourth control switching modes switching between two of the above modes, each consisting of a combination of engine control under the FCT control and brake control modifying brake forces applied to the wheels.

The normal control mode performs both the FCT control and the brake control. The brake control mode prohibits the FCT control, while it performs the brake control. The engine control mode prohibits the brake control, while it performs the FCT control. The control prohibiting mode prohibits both the FCT control and the brake control.

The first control switching mode switches between the normal control mode and the brake control mode. When the normal control mode is switched to the brake control mode, the activity of the engine control is restricted gradually at a given rate while the activity of the brake control is gradually increased. Conversely, when the brake control mode is switched to the normal control mode, the activity of the engine control is resumed gradually while the activity of the brake control is restricted gradually.

The second control switching mode is provided to switch between the normal control mode and the engine control mode. When the normal control mode is switched to the engine control mode, the brake control is restricted gradually while the engine control is activated gradually. Conversely, when the engine control mode is switched to the normal control mode, the brake control is resumed gradually while the engine control is restricted gradually.

The third control switching mode is provided to switch between the brake control mode and the control prohibiting mode. When the brake control mode is switched to the control prohibiting mode, the brake control is restricted gradually. The third control switching mode only switches the brake control mode to the control prohibiting mode.

The fourth control switching mode is provided to switch between the engine control mode and the control prohibiting mode. When the engine control mode is switched to the control prohibiting mode, the engine control is restricted gradually. The fourth control switching mode, like to the third control switching mode, only switches the engine control mode to the control prohibiting mode.

Figure 4:
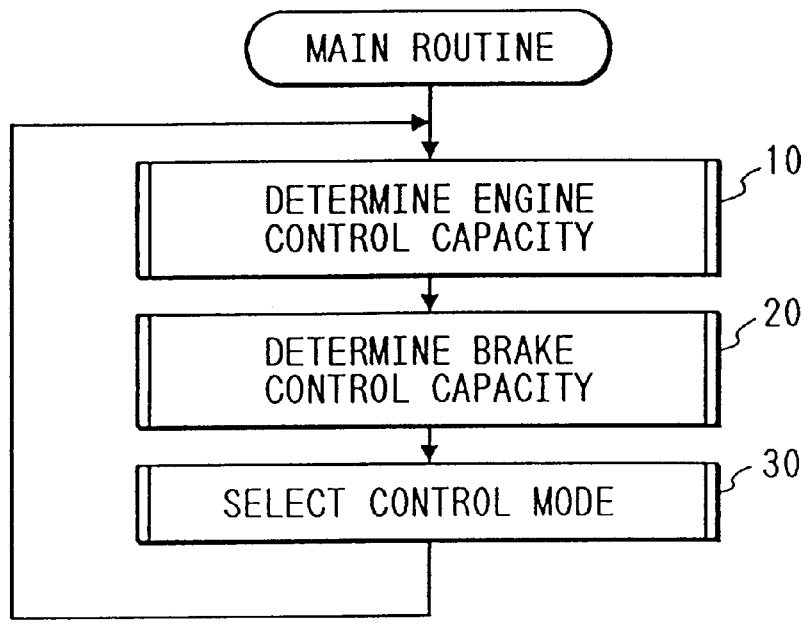
FIG. 4 is a flowchart of a main program performed by a traction control system.

FIG. 4 shows a flowchart of a main program performed by the slippage control unit 50.

After entering the program, the routine proceeds to step 10 wherein a margin or capacity of the engine control is determined. The routine then proceeds to step 20 wherein a capacity of the brake control is determined. The routine then proceeds to step 30 wherein one of the above control modes is selected.

Figure 5:
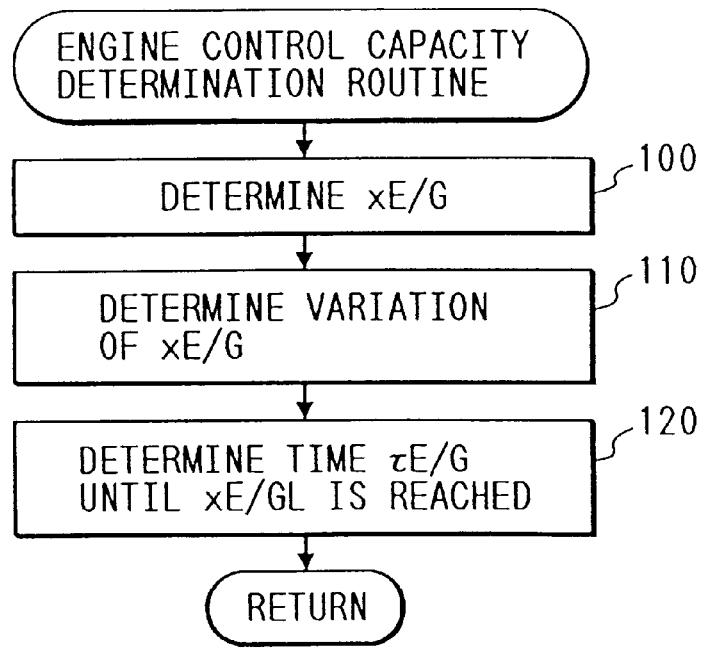
FIG. 5 is a flowchart of a program for determining an engine control capacity used in traction control of this invention.

The determination of the capacity of the engine control in step 10 of FIG. 4 is described in detail with reference to FIGS. 5 and 6.

Figure 6:
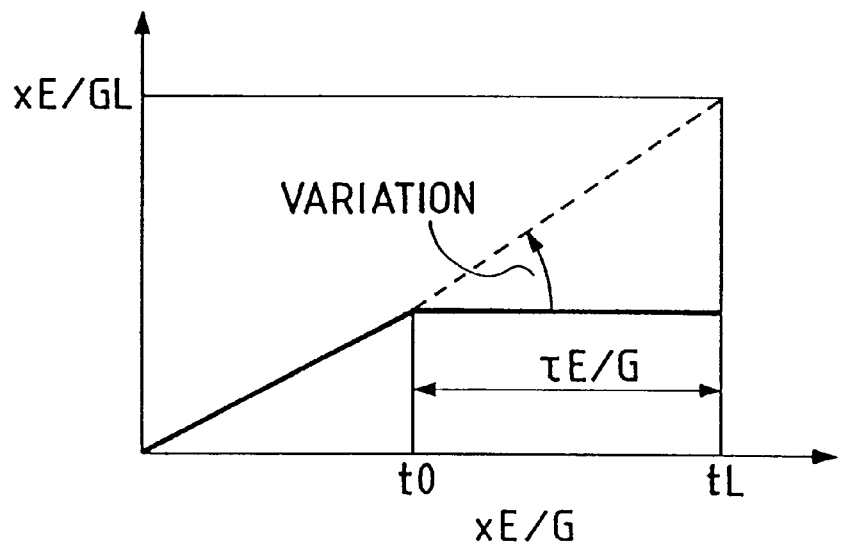
FIG. 6 is a graph which shows the relation between an engine control parameter $_\chi$ E/G for determining the capacity of engine control and an engine control-prohibiting value $_\chi$ E/GL.

In step 100, an engine control parameter $_\chi$ E/G at the present time tO is, as shown in FIG. 6, calculated for determining the capacity of the engine control (hereinafter, referred to as an engine control capacity). For example, assuming that the engine control capacity depends on the temperature of the catalyst, the temperature of catalyst is used as the engine control parameter $_\chi$ E/G.

The routine then proceeds to step 110 wherein a variation in the engine control parameter $_\chi$ E/G is determined.

Specifically, a variation in the temperature of the catalyst is determined which is represented by a gradient of a broken line in FIG. 6.

The routine then proceeds to step 120 wherein a time left until an engine control-prohibiting value $_x$E/GL is reached is projected based on the engine control parameter $_x$E/G derived at time t0 and the variation in the engine control parameter $_x$E/G, after which the routine returns. Specifically, in step 120, a period of time until the temperature of the catalyst reaches a given limit at which the engine control should be prohibited, is determined as the engine control capacity τ E/G based on the temperature of the catalyst at time t0 and its variation. Note that the engine control capacity τ E/G may alternatively be determined based on a control permit capacity as represented by, for example, the number of FCT-subjected cylinders Σ×time t. Additionally, the engine control capacity τ E/G may also be determined based on the amount of degradation of allowable emissions of the engine during feedback control based on the concentration of oxygen contained in exhaust gases, a period of time until the amount of the allowable emission reaches a given engine control-prohibiting value determined by the amount of degradation of the allowable emission, a variation in engine speed, and a period of time until the engine speed reaches a given engine control-prohibiting value determined by the variation in engine speed. Further, if the traction control system is used with an electric vehicle, the engine control capacity τ E/G may be determined based on the temperature of an electric motor and a driver of the electric motor or the length of time the electric motor is actuated.

Figure 7:
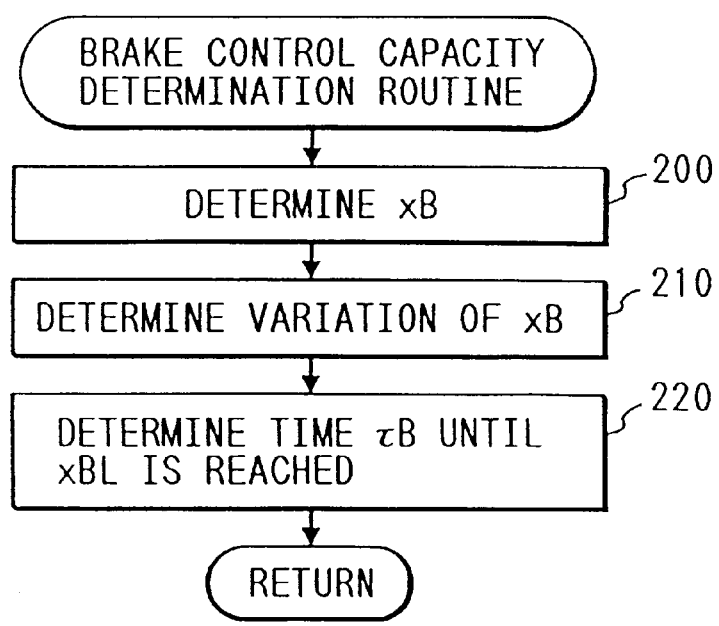
FIG. 7 is a flowchart of a program for determining a brake control capacity.

The determination of the capacity of the brake control in step 20 shown in FIG. 4 will be described below with reference to FIG. 7.

In step 200, a brake control parameter $_x$B at time t0 is derived for determining the capacity of the brake control (hereinafter, referred to as a brake control capacity). For example, assuming that the brake control capacity depends upon the temperature of a brake fluid, the temperature of the brake fluid is used as the brake control parameter $_x$B.

The routine then proceeds to step 210 wherein a variation in the brake control parameter $_x$B is determined. Specifically, a variation in temperature of the brake fluid is determined.

The routine then proceeds to step 220 wherein a time left until a brake control-prohibiting value $_x$BL is reached is projected based on the brake control parameter $_x$B derived at time t0 and the variation in the brake control parameter, after which the routine returns. Specifically, a period of time until the temperature of the brake fluid reaches a given limit at which the brake control should be prohibited is determined as the brake control capacity τB based on the temperature of the brake fluid at time t0 and its variation. Note that the brake control capacity τB may alternatively be determined based on the temperature of an actuator such as a motor of a hydraulic pump or a solenoid of a directional control valve, the time during which the actuator is controlled, a duty factor of a control signal applied to the actuator, the temperature of a braking system (e.g., the temperature of a brake pad), or the temperature or controlled period of time of an electronic control unit for the brake control.

The control mode selection in step 30 shown in FIG. 4 will be described below with reference to the flowcharts shown in FIGS. 8 to 10.

SWITCHING NORMAL CONTROL MODE TO BRAKE CONTROL MODE

Figure 8:
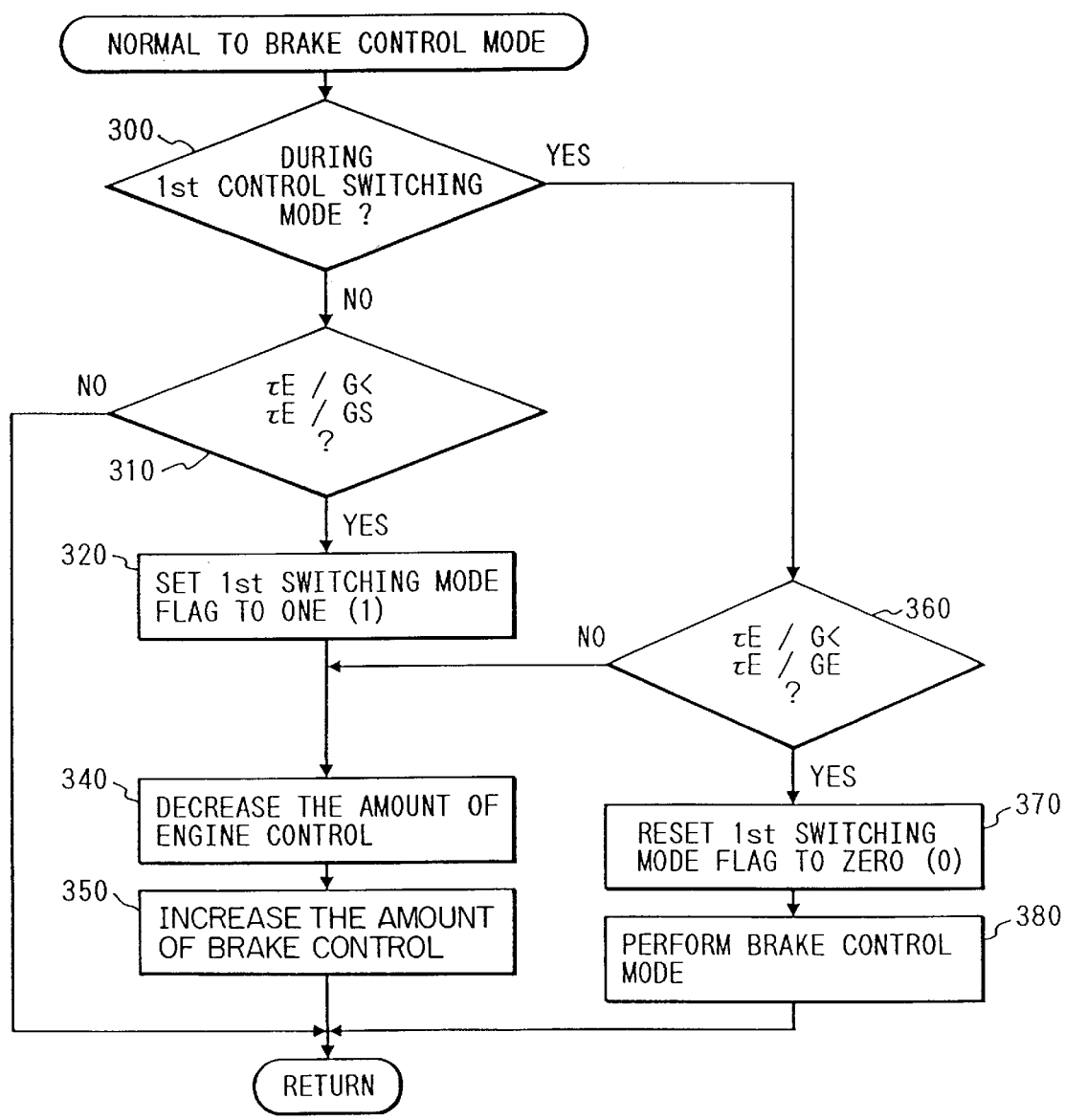
FIG. 8 is a flowchart of a program performed for switching a normal control mode to a brake control mode.

FIG. 8 shows a program performed to switch the normal control mode to the brake control mode.

After entering step 30 in FIG. 4, the routine proceeds to step 300 wherein it is determined whether the traction control system is in the first control switching mode or not. If a NO answer is obtained, then the routine proceeds to step 310 wherein it is determined whether the engine control capacity τ E/G is less than a control enable threshold value τ E/GS or not, in other words, it is determined whether the time left for the engine control is decreased below a given value or not.

If a NO answer is obtained, then the routine terminates to maintain the normal control mode as is. Alternatively, if a YES answer is obtained, then the routine proceeds to step 320 wherein a first control switching mode flag which indicates initiation of the first control switching mode is set to one (1).

The routine then proceeds to step 330 wherein the engine control is corrected so as to be decreased gradually according to the engine control capacity τ E/G. Engine control is performed for recovering the engine control capacity τ E/G. For instance, if the engine control capacity τ E/G depends upon the temperature of the catalyst, the engine control is carried out to prevent the temperature of the catalyst from rising. The increase in temperature of the catalyst may be suppressed by increasing FCT-subjected cylinders, for example, by changing the number of FCT-subjected cylinders from 1 or 2 to 4 or 5 to decrease the amount of unburned gas, which will be fired spontaneously with oxygen in the catalyst, for increasing the engine control capacity τ E/G, that is, for prolonging the time required for the temperature of the catalyst to reach the given threshold value prohibiting the engine control. When the engine speed is increased undesirably, a gear position of an automatic transmission may be shifted up to decrease the engine speed. Further, the engine control capacity may be increased by decreasing the quantity of heat generated by the electric motor 6 (i.e., a coil). For example, the quantity of heat generated by 1–2 phase energization in a step motor is smaller than that generated by 2-phase energization. Additionally, the quantity of heat may also be decreased by switching energized phases of the step motor.

The routine then proceeds to step 350 wherein the activity of the brake control is increased according to a decrease in activity of the engine control.

If a YES answer is obtained in step 300 meaning that the traction control system is in the first control switching mode, then the routine proceeds to step 360 wherein it is determined whether the engine control capacity τ E/G is less than a control disable threshold value τ E/GE (<the control enable threshold value τ E/GS) or not which closes the first control switching mode, in other words, it is determined whether the time until prohibition of the engine control is decreased below a given value. If a YES answer is obtained, then the routine proceeds to step 370. Alternatively, if a NO answer is obtained, then the routine proceeds to step 340 to maintain the engine control in the first control switching mode. As an alternative to the determination in step 360, it may be determined whether a correction of decreasing the activity of the engine control has reached a preselected level or not.

In step 370, the first control switching mode flag is reset to zero (0). In step 380, the traction control system enters the brake control mode.

According to the above control, when the traction control system is in the first switching mode, the FCT control is performed so as to prevent the engine control capacity $\tau$ E/G from being decreased, and the activity of the engine control is decreased while increasing the activity of the brake control for allowing the traction control to be switched from the normal control mode to the brake control mode smoothly.

SWITCHING BRAKE CONTROL MODE TO NORMAL CONTROL MODE

Figure 9:
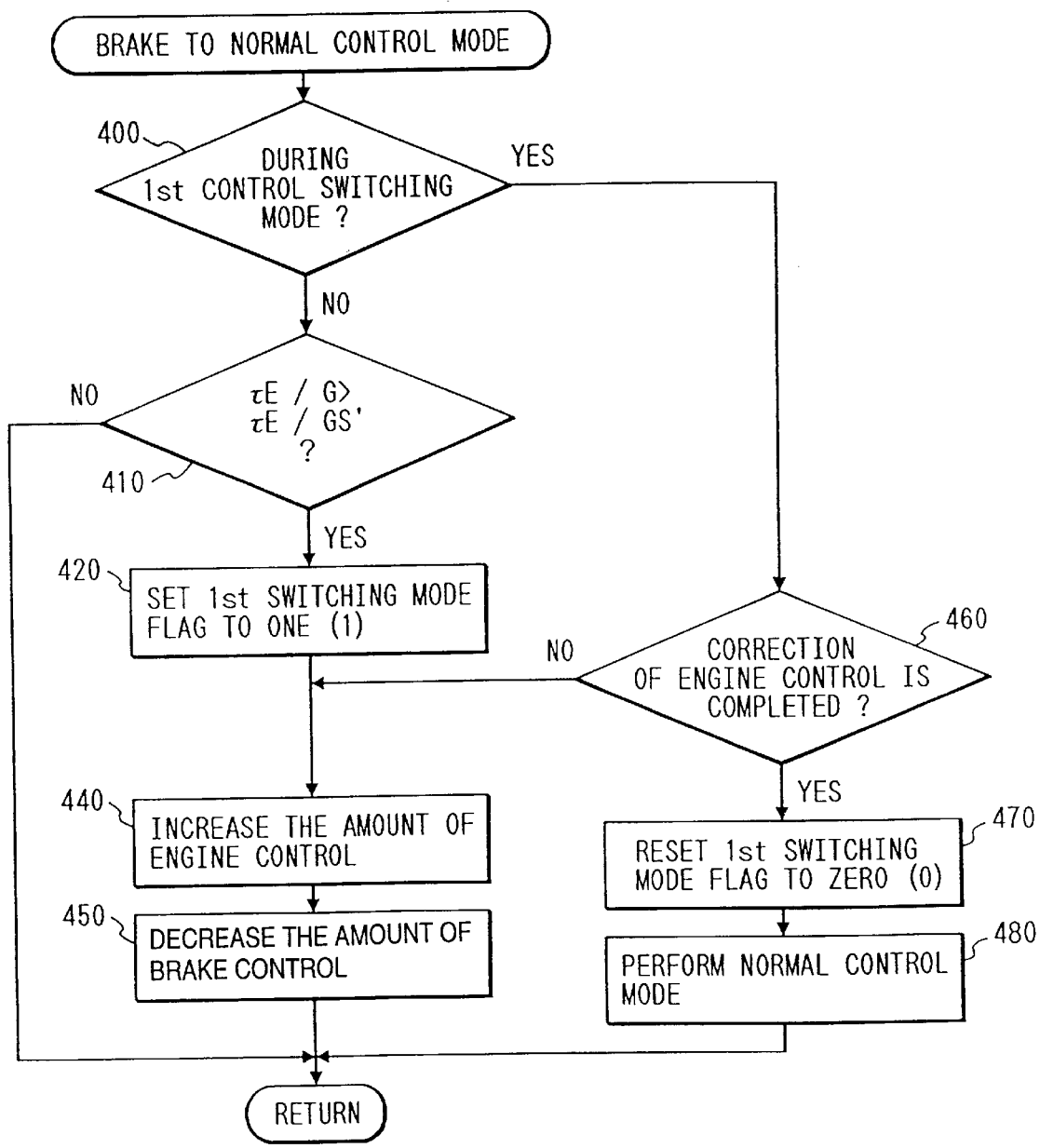
FIG. 9 is a flowchart of a program performed for switching a brake control mode to a normal control mode.

FIG. 9 shows a flowchart of a program for resuming the normal control mode from the brake control mode.

After entering the program, the routine proceeds to step 400 wherein it is determined whether the traction control system is operating in the first switching mode or not. If a YES answer is obtained, then the routine proceeds to step 460, while if a NO answer is obtained, then the routine proceeds to step 410.

In step 410, it is determined whether the engine control capacity $\tau$ E/G is greater than a control enable threshold value $\tau$ E/GS' or not, in other words, it is determined whether the time left for the engine control is increased above a given value or not. If a YES answer is obtained, then the routine proceeds to step 420, while if a NO answer is obtained, then the routine terminates, maintaining the brake control mode as is. Note that the control enable threshold value $\tau$ E/GS' has a hysteresis for avoiding control hunting, and is greater than the control enable threshold value $\tau$ E/GS used in step 310 of FIG. 8.

In step 420, the first control switching mode flag which indicates initiation of the first control switching mode is set to one (1) since the time left for the engine control is increased, so that the traction control system enters the first control switching mode for resuming the normal control mode.

The routine then proceeds to step 440 wherein the activity of the engine control is increased gradually according to the engine control capacity $\tau$ E/G.

The routine then proceeds to step 450 wherein the activity of the brake control is decreased according to an increase in activity of the engine control.

If a YES answer is obtained in step 400 meaning that the traction control system is in the first control switching mode, then the routine proceeds to step 460 wherein it is determined whether the activity of the engine control has been corrected to reach a given value or not. If a YES answer is obtained, then the routine proceeds to step 470, while if a NO answer is obtained, then the routine proceeds to step 440 to continue the control in the first control switching mode.

In step 470, since the traction control system is returned to the normal control mode through the first control switching mode, the first control switching mode flag is reset to zero (0). The routine then proceeds to step 480 wherein the traction control system starts to operate in the normal control mode.

As will be apparent from the above discussion, the resumption of the normal control mode from the brake control mode is accomplished by changing the engine control capacity $\tau$ E/G through the first control switching mode to increase the activity of the engine control gradually.

SWITCHING NORMAL CONTROL MODE TO ENGINE CONTROL MODE

The switching operation from the normal control mode to the engine control mode through the second control switching mode is basically identical with the switching operation from the normal control mode to the brake control mode through the first control switching mode, as described above, except that the brake control is performed based on the brake control capacity, and explanation thereof in detail will be omitted here.

SWITCHING ENGINE CONTROL MODE TO NORMAL CONTROL MODE

The switching operation from the engine control mode to the normal control mode through the second control switching mode is basically identical with the switching operation from the brake control mode to the normal control mode through the first control switching mode, as described above, except that the brake control is performed based on the brake control capacity, and explanation thereof in detail will be omitted here.

SWITCHING ENGINE CONTROL MODE TO CONTROL PROHIBITING MODE

Figure 10:
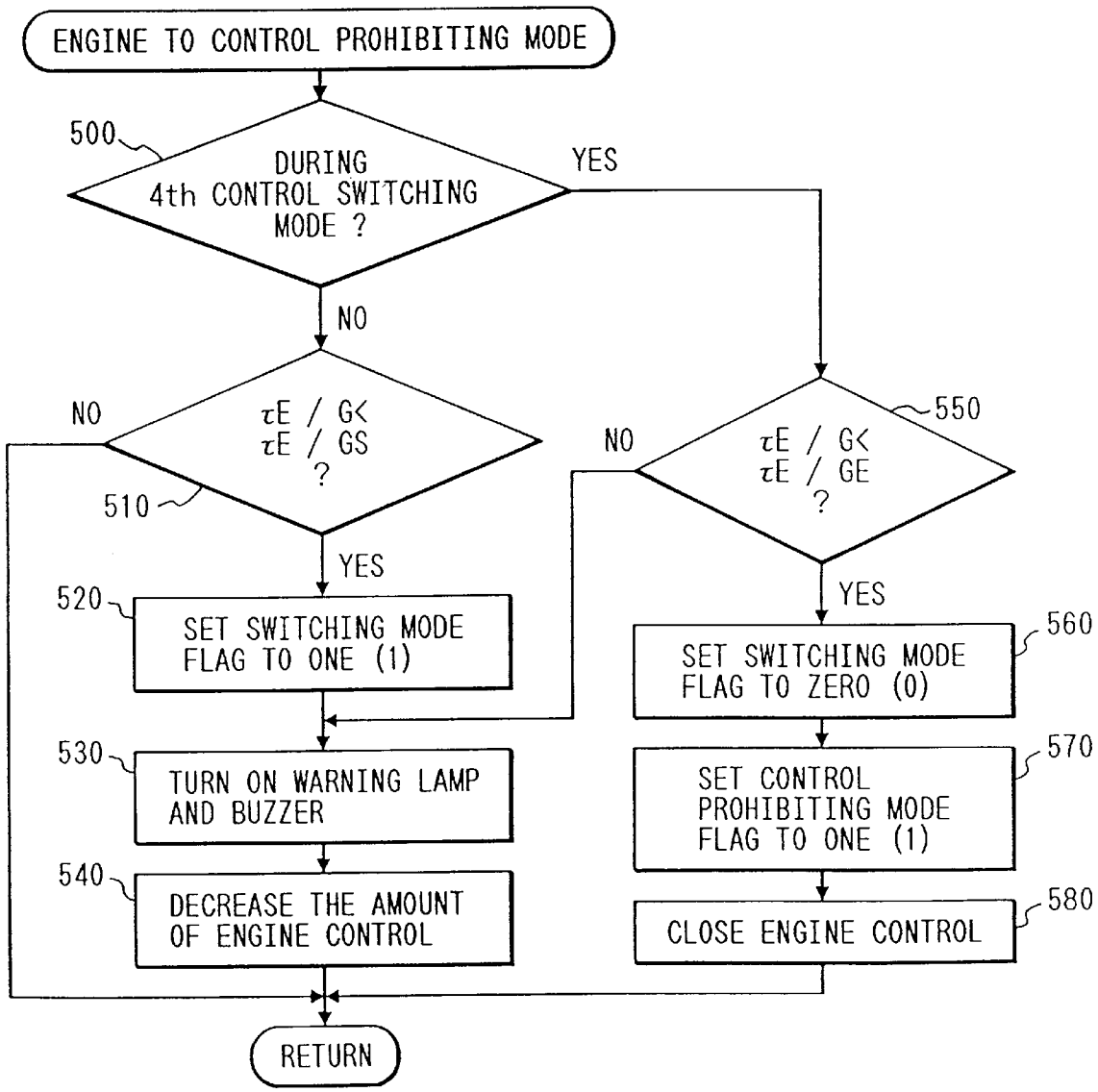
FIG. 10 is a flowchart of a program performed for switching an engine control mode to a control prohibiting mode.

FIG. 10 shows a flowchart of a program performed to switch the engine control mode to the control prohibiting mode.

After entering the program, the routine proceeds to step 500 wherein it is determined whether the traction control system is in the fourth control switching mode or not. If a NO answer is obtained, then the routine proceeds to step 510 wherein it is determined whether the engine control capacity $\tau$ E/G is less than the control enable threshold value $\tau$ E/GS or not, in other words, it is determined whether the time left for the engine control is decreased below a given value or not.

If a NO answer is obtained in step 510, then the routine terminates to continue the traction control in the engine control mode as is while prohibiting the brake control. Alternatively, if a YES answer is obtained meaning that the time left for the engine control is decreased to a value at which the fourth control switching mode should be started, then the routine proceeds to step 520 wherein a fourth control switching mode flag which indicates initiation of the fourth control switching mode is set to one (1).

The routine then proceeds to step 530 wherein the warning lamp 51 and the warning buzzer 53 are turned on to inform the vehicle operator that the traction control system has entered the control prohibiting mode. As an alternative to turning on the warning lamp 51 and the warning buzzer 53, it is possible to change the vehicle behavior within a safe range. For example, slow vehicle vibrations may be generated by changing fuel cut-subjected cylinders to vibrate the engine, turning on and off the throttle valve, or increasing and decreasing the hydraulic pressure of the brake fluid to change wheel slippage.

The routine then proceeds to step 540 wherein the activity of the engine control is corrected to be decreased gradually.

If a YES answer is obtained in step 500 meaning that the traction control system is in the fourth control switching mode, then the routine proceeds to step 550 wherein it is determined whether the engine control capacity $\tau$ E/G is less than a control disable threshold value $\tau$ E/GE (<the control enable threshold value $\tau$ E/GS) which closes the fourth control switching mode, in other words, it is determined whether the time until prohibition of the engine control is decreased below a given value. If a YES answer is obtained, then the routine proceeds to step 560. Alternatively, if a NO answer is obtained, then the routine proceeds to step 530 to turn on the warning lamp 51 and the warning buzzer 53.

As an alternative to the determination in step 550, it may be determined whether a preselected period of time has expired after the traction control system enters the fourth control switching mode.

If a YES answer is obtained in step 550 meaning that the time left for the engine control is decreased below the given value, so that the fourth control switching mode terminates, then the routine proceeds to step 560 wherein the fourth control switching mode flag is reset to zero (0).

The routine then proceeds to step 570 wherein a control prohibiting mode flag is set to one (1) which Indicates that the traction control system is operating in the control prohibiting mode.

The routine then proceeds to step 580 wherein the engine control is closed in addition to the brake control which has already terminated.

As will be appreciated from the above discussion, during the switching operation from the engine control mode to the control prohibiting mode in the fourth control switching mode, a warning signal is issued until the control prohibiting mode is entered, and the activity of the engine control is decreased gradually according to the engine control capacity τ E/G for establishing a smooth control transition to the control prohibiting mode.

SWITCHING BRAKE CONTROL MODE TO CONTROL PROHIBITING MODE

The switching operation in the third control switching mode is basically identical with the switching operation from the engine control mode to the control prohibiting mode, as described above, except that the brake control is restricted based on the brake control capacity, and explanation thereof in detail will be omitted here.

Note that if the engine control capacity τ E/G becomes smaller than a preselected value during the above mentioned switching operations, the control based on the engine control capacity τ E/G is disabled for safety of traction control.

The effects offered by the above mentioned traction control will be discussed below.

(1) The traction control system of this invention, as discussed above, increases or decreases the activity of the traction control according to the engine and brake control capacities during transitional operations, or the control switching modes between the normal control mode and the engine control mode, between the normal control mode and the brake control mode, between the engine control mode and the control prohibiting mode, and between the brake control mode and the control prohibiting mode. Thus, mechanical shock during the changing between the control modes is reduced to achieve stable traveling control of an automotive vehicle.

(2) When the engine control or the brake control is restricted during any of the control switching modes, a variation in the corresponding control capacity is adjusted, so that wheel slippage or traction of the wheels is controlled effectively. For instance, when a marginal temperature of catalyst under the engine control is decreased, a sufficient time for performing the control switching mode is obtained by having the traction control system perform the FCT control to restricting the temperature of the catalyst from rising for improving the controllability.

(3) When the engine control or the brake control are prohibited in the brake control mode or the engine control mode, and when the corresponding control capacity is recovered, for example, when the temperature of the catalyst is decreased during the brake control mode, the engine control is resumed according to a decrease in temperature of the catalyst. Therefore, a controlled condition of the vehicle is prevented from being changed suddenly during resumption of control as well as restriction of control.

(4) When control is resumed, the traction control system enters the control switching mode when the control capacity exceeds a given control enable value greater than a control disable value. In other words, a hysteresis is provided between the resumption and prohibition of the control, thereby avoiding control hunting.

(5) In the first and second control switching modes, both the engine control and the brake control are performed to suppress wheel slippage. For example, in the first control switching mode, the activity of the engine control is decreased according to the engine control capacity while increasing the activity of the brake control according to the decrease in activity of the engine control. Thus, the controlled condition of the vehicle is prevented from being changed suddenly to achieve stable traction control.

The activity of one of the controls, for example, the brake control which is changed according to the activity of the engine control may be determined only based on the activity of the engine control, however, it is more advisable that the activity of the brake control also be determined based on the brake control capacity. In this case, if the brake control capacity is changed suddenly for some reason, the activity of the engine control may be increased. Additionally, when the brake control capacity is decreased below a given value, the brake control is prohibited while performing the engine control only.

(6) The relation between the activities of the brake control and the engine control is similar to that mentioned in the above (5). Specifically, even during the resumption of the control, controlled condition of the vehicle is prevented from being changed suddenly to eliminate acceleration-caused wheel slippage.

(7) In the third and fourth control switching modes in which one of the engine control and the brake control is already prohibited, the warning lamp 51 and the warning buzzer 53 are turned on to inform the driver that the traction control system is being shifted to the control prohibiting mode which prohibits both the engine and brake controls, so that the driver visually and acoustically perceives a controlled condition of the vehicle.

While the present invention has been disclosed in terms of the preferred embodiment in order to facilitate a better understanding thereof, It should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, instead of the above control of speed of the driven wheels which decreases a slip ratio, EDL (electric differential) control may be performed to monitor a difference in speed between the right and left driven wheels 26RR and 26RL through the wheel speed sensors 44RR and 44RL to eliminate the difference in speed under the engine control and the brake control to recover traction at the driven wheels for improving the stability during traveling on a low-friction road surface.

What is claimed is:

1. A traveling control apparatus for an automotive vehicle comprising:

control means for controlling at least one of a driving force and a braking force acting on a wheel of the vehicle;

controlled condition determining means for determining a controlled condition of the at least one of the driving force and the braking force controlled by the control means;

storage means for storing a predetermined control limit based on durability of at least one of a plurality of structural elements of the vehicle;

control capacity determining means for determining a control capacity of the control means under the controlled condition determined by the controlled condition determining means, the control capacity being an amount of capacity of the control means available until the predetermined control limit stored in said storage means is reached; and controlled condition controlling means for controlling the controlled condition provided by said control means according to the control capacity determined by said control capacity determining means.

2. A traveling control apparatus as set forth in claim 1, wherein:

the control means comprises:

driving force controlling means for controlling the driving force acting on the wheel of the vehicle, and braking force controlling means for controlling the braking force acting on the wheel of the vehicle, said control capacity determining means determining the control capacity of at least one of the driving force controlling means and the braking force controlling means, the controlled condition controlling means controlling the controlled condition provided by the at least one of the driving force controlling means and the braking force controlling means based on the determined control capacity.

3. A traveling control apparatus as set forth in claim 1, wherein the controlled condition controlling means has a switching mode in which a degree of the control of the controlled condition is gradually changed based on a relation between the predetermined control limit and a threshold value of the control capacity, the threshold value being based on the predetermined control limit.

4. A traveling control apparatus as set forth in claim 1, wherein the controlled condition controlling means restricts the control of the controlled condition according to the control capacity so as to modify a change in the control capacity.

5. A traveling control apparatus as set forth in claim 1, wherein the control means prohibits control of the at least one of the driving force and the braking force when the control capacity is less than a given threshold value.

6. A traveling control apparatus as set forth in claim 5, further comprising control resuming means for causing the control means to resume control according to the control capacity when said control means prohibits the control of the at least one of the driving force and the braking force.

7. A traveling control apparatus as set forth in claim 6, wherein the control resuming means has a control switching mode which causes the control means to gradually resume a degree of the control of the at least one of the driving force and the braking force, a rate at which the degree of control is resumed by the control means being a measure of control of the control means caused by the control resuming means when the control means prohibits control of the at least one of the driving force and the braking force, the rate being determined as a value for preventing the predetermined control limit from being reached.

8. A traveling control apparatus as set forth in claim 7, wherein said control resuming means enters the control switching mode when the control capacity exceeds a second given threshold.

9. A traveling control apparatus as set forth in claim 2, wherein:

the control capacity determining means determines the control capacity of one of the driving force controlling means and the braking force controlling means available until the control capacity reaches a given threshold value at which time the control means prohibits the control of the one of the driving force controlling means and the braking force controlling means, the controlled condition controlling means including first control adjusting means and second control adjusting means, the first control adjusting means adjusting a degree of the control of the one of the driving force controlling means and the braking force controlling means according to the control capacity determined by the control capacity determining means, the second control adjusting means adjusting a degree of the control of the other of the driving force controlling means and the braking force controlling means based on the degree of the control of the one of the driving force controlling means and the braking force controlling means adjusted by the first control adjusting means.

10. A traveling control apparatus as set forth in claim 9, wherein the degree of the control of the one of the driving force controlling means and the braking force controlling means is increased according to a decrease in the degree of the control of the other of the driving force controlling means and the braking force controlling means.

11. A traveling control apparatus as set forth in claim 9, wherein when a prohibition of the control of the one of the driving force controlling means and the braking force controlling means is released, the degree of the control of the other of the driving force controlling means and the braking force controlling means is adjusted according to the degree to which the prohibition of the control of the one of the driving force controlling means and the braking force controlling means is released.

12. A traveling control apparatus as set forth in claim 11, wherein the degree of the control of the other of the driving force controlling means and the braking force controlling means is decreased according to an increase in the degree of the control of the one of the driving force controlling means and the braking force controlling means.

13. A traveling control apparatus as set forth in claim 1, wherein the control capacity determining means determines a variation in the controlled condition with respect to time to determine the control capacity based on the determined variation in the controlled condition.

14. A traveling control apparatus as set forth in claim 1, wherein the control means is a braking actuator including a solenoid valve regulating a braking fluid pressure acting on the wheel of the vehicle, the controlled condition determining means determining a temperature of the solenoid valve of the braking actuator as the controlled condition, the storage means storing therein a temperature limit of the solenoid valve as the control limit, the controlled condition controlling means restricting activity of the control means when the temperature of the solenoid valve exceeds the temperature limit.

15. A traveling control apparatus as set forth in claim 1, wherein the control means is a driving force control means for controlling the driving force provided by an engine of the vehicle, the controlled condition determining means determining a temperature of a catalyst in a catalytic converter as the controlled condition, the storage means storing therein a temperature limit of the catalyst as the control limit, the controlled condition controlling means restricting activity of the control means when the temperature of the catalyst exceeds the temperature limit.

16. A traveling control apparatus as set forth in claim 1, wherein the control means is a braking actuator including a pump driven by a motor for regulating a braking fluid pressure acting on the wheel of the vehicle, the controlled condition determining means determining as the controlled condition a controlled period of time during which the motor is operated, the storage means storing therein a limit of the controlled period of time as the control limit, the controlled condition controlling means restricting activity of the control means when the controlled period of time of the motor exceeds the limit stored in the storage means.

17. A traveling control apparatus for an automotive vehicle comprising:

control means for controlling a first operation of the automotive vehicle and a second operation of the automotive vehicle, the control means comprising:
first operation controlling means for controlling the first operation of the automotive vehicle to modify a given traveling condition, and
second operation controlling means for controlling the second operation of the automotive vehicle to modify the given traveling condition;

controlled condition determining means for determining a controlled condition of the control means:

control capacity determining means for determining a control capacity of the second operation controlling means under the controlled condition determined by the controlled condition determining means, the control capacity being an amount of capacity of the second operation controlling means available until the control capacity reaches a given limit;

controlled condition controlling means for controlling the controlled condition provided by the control means according to the control capacity determined by the control capacity determining means; and warning means for providing a warning signal according to the controlled condition determined by the controlled condition determining means.

18. A traveling control apparatus as set forth in claim 17, wherein:

the first operation controlling means controls a driving force transmitted to a wheel of the automotive vehicle,
the second operation controlling means controls a braking force applied to the wheel,
the control capacity determining means determines a driving force controlling capacity and a braking force controlling capacity, and
the controlled condition controlling means adjusting degrees of control of the first operation controlling means and the second operation controlling means according to the driving force controlling capacity and the braking force controlling capacity.

19. A traveling control apparatus as set forth in claim 18, further comprising:

acceleration-caused wheel slippage detecting means for detecting acceleration-caused wheel slippage, wherein:
the first operation controlling means controls engine power to modify the driving force for restricting the acceleration-caused wheel slippage, and
the second operation controlling means controls the braking force for restricting the acceleration-caused wheel slippage.

20. A traveling control apparatus as set forth in claim 19, further comprising wheel speed difference determining means for determining a wheel speed difference between right and left wheels, wherein:

the first operation controlling means controlling the engine power to restrict the wheel speed difference, and
the second operation controlling means controlling the braking force to restrict the wheel speed difference.

21. A traveling control apparatus for regulating a braking force applied to a wheel of a vehicle comprising:

braking force regulating means for regulating a braking force of the wheel;

traveling condition detecting means for detecting a traveling condition of the vehicle;

braking controlling means for controlling the braking force regulating means to regulate the braking force based on the traveling condition detected by the traveling condition detecting means to bring the vehicle into a desired traveling condition;

operation condition detecting means for detecting an operation condition of the braking force regulating means during control of the braking force by the braking force regulating means;

braking control capacity determining means for determining a braking control capacity until an operation condition of the braking force regulating means reaches a control prohibiting condition where the braking force regulating means is prohibited by the braking controlling means from controlling the braking force of the wheel; and braking force control changing means for changing a degree to which the braking force of the wheel is controlled by the braking force regulating means according to the braking control capacity determined by the braking control capacity determining means.

22. A traveling control apparatus as set forth in claim 21, wherein the braking force control changing means decreases the degree to which the braking force of the wheel is controlled by the braking force regulating means according to a decrease in the braking control capacity determined by the braking control capacity determining means.

23. A traveling control apparatus as set forth in claim 21, wherein the braking force control changing means deactivates the braking force regulating means when the braking control capacity is decreased below a given threshold value.

24. A traveling control apparatus as set forth in claim 23, wherein when the braking control capacity is increased to a second threshold value after the braking force regulating means is deactivated, the braking force control changing means releases the deactivation of said braking force regulating means to resume the regulation of the braking force of the wheel.

25. A traveling control apparatus for a vehicle comprising:

engine operation condition detecting means for detecting an operation condition of an engine mounted on the vehicle;

first control capacity determining means for determining an engine control capacity until the operation condition of the engine detected by the engine operation condition detecting means reaches a control prohibiting condition where an output power of the engine is prohibited from being regulated;

braking force regulating means for regulating a braking force applied to a wheel;

braking operation condition detecting means for detecting an operation condition of the braking force regulating means;

second control capacity determining means for determining a braking control capacity until the operation condition of the braking force regulating means reaches a control prohibiting condition where said braking force regulating means is prohibited from regulating the braking force applied to the wheel;

traveling condition detecting means for detecting a traveling condition of the vehicle;

regulation determining means for determining an amount of regulation of the output power of the engine and an amount of regulation of the braking force applied to the wheel, respectively, based on the traveling condition detected by the traveling condition detecting means so as to bring the vehicle into a desired traveling condition; and regulation correcting means for correcting the amount of regulation of the output power of the engine and the amount of regulation of the braking force based on the engine control capacity and the braking control capacity determined by the first and the second control capacity determining means, respectively, when the regulation correcting means corrects one of the amount of regulation of the output power of the engine and the amount of regulation of the braking force, the regulation correcting means correcting the other of the amount of regulation of the output power of the engine and the amount of regulation of the braking force according to a corrected amount of regulation.

26. A traveling control apparatus as set forth in claim 25, wherein the regulation correcting means decreases the amount of regulation of the output power of the engine as the engine control capacity determined by the first control capacity determining means decreases, and the regulation correcting means decreases the amount of regulation of the braking force as the braking control capacity determined by the second control capacity determining means decreases.

27. A traveling control apparatus as set forth in claim 26, wherein when the amount of regulation of one of the output power of the engine and the braking force is decreased, the amount of regulation of the other of the output power of the engine and the braking force is increased according to a decrease in the amount of regulation of the one of the output power of the engine and the braking force.

28. A traveling control apparatus as set forth in claim 25, wherein the regulation determining means determines the amount of regulation of the output power of the engine and the amount of regulation of the braking force, respectively, so as to restrict acceleration-caused slippage occurring at the wheel.

29. A traveling control apparatus as set forth in claim 25, wherein when a speed difference is created between right and left wheels of the vehicle, the regulation determining means determines the amount of regulation of the output power of the engine and the amount of regulation of the braking force, respectively, so as to restrict the speed difference.

30. A traveling control apparatus for an automotive vehicle comprising:

control means for controlling at least one of a driving force and a braking force acting on a wheel of the vehicle;

controlled condition determining means for determining a controlled condition of the at least one of the driving force and the braking force controlled by the control means;

storage means for storing the controlled condition determined by the controlled condition determining means;

control limit determining means for determining a control limit of the control means;

control capacity determining means for determining based on the controlled condition stored in the storage means a control capacity of the control means available until the control limit is reached; and controlled condition restricting means for restricting the controlled condition provided by the control means according to the control capacity determined by the control capacity determining means.

31. A traveling control apparatus as set forth in claim 30, wherein the control capacity determining means determines a variation in the controlled condition with respect to time to determine as the control capacity a control allowable period of time during which the control means is allowed to control the at least one of the driving force and the braking force based on the determined variation in the controlled condition.

32. A traveling control apparatus for an automotive vehicle comprising:

an engine control system controlling a driving force provided by an engine to a wheel;

a brake control system controlling a braking force acting on the wheel;

engine controlled condition determining means for determining a controlled condition by the engine control system;

braking controlled condition determining means for determining a controlled condition by the braking control system;

first storage means for storing therein a first predetermined control limit based on durability of at least one of components making up the engine control system;

second storage means for storing therein a second predetermined control limit based on durability of at least one of components making up the braking control system;

engine control capacity determining means for determining an engine control capacity of the engine control system available until the first predetermined control limit stored in the first storage means is reached;

brake control capacity determining means for determining a brake control capacity of the brake control system available until the second predetermined control limit stored in the second storage means is reached; and control changing means for changing a ratio of control activity of the engine control system to control activity of the brake control system according to the engine control capacity and the brake control capacity.

* * * * *